United States Patent
Kolega et al.

(10) Patent No.: US 7,181,865 B2
(45) Date of Patent: Feb. 27, 2007

(54) DEVICE FOR DRYING PRODUCTS SUCH AS IN PARTICULAR PURIFYING STATION SLUDGE

(75) Inventors: Stiv Kolega, Chaumontel (FR); Ulrich Luboschik, Kandern-Wollbach (DE)

(73) Assignee: Degremont, Rueil Malmaison (FR)

( * ) Notice: Subject to any disclaimer, the term of this patent is extended or adjusted under 35 U.S.C. 154(b) by 0 days.

(21) Appl. No.: 10/525,516

(22) PCT Filed: Aug. 26, 2003

(86) PCT No.: PCT/FR03/02582

§ 371 (c)(1),
(2), (4) Date: Apr. 19, 2005

(87) PCT Pub. No.: WO2004/020922

PCT Pub. Date: Mar. 11, 2004

(65) Prior Publication Data

US 2005/0241174 A1    Nov. 3, 2005

(30) Foreign Application Priority Data

Aug. 28, 2002   (FR)   .................................. 02 10693

(51) Int. Cl.
*F26B 9/10* (2006.01)
*F26B 3/28* (2006.01)
*F26B 25/04* (2006.01)

(52) U.S. Cl. .............................. 34/572; 34/586; 34/93; 34/181

(58) Field of Classification Search .................. 34/576, 34/582, 586, 69, 93, 572, 179, 181
See application file for complete search history.

(56) References Cited

U.S. PATENT DOCUMENTS 2,279,848 A    4/1942  Unger (Continued)

FOREIGN PATENT DOCUMENTS

CH    684 771 A    12/1994

(Continued)

OTHER PUBLICATIONS

Bux M. Et al., "Volume Reduction and Biological Stablisation of Sludge in Small Sewage Plants by Solar Drying," Drying Technology, Marcel Dekker, New York, YS, vol. 20, No. 4/5, 2002, pp. 829-837.

(Continued)

*Primary Examiner*—Jiping Lu
(74) *Attorney, Agent, or Firm*—Connolly Bove Lodge & Hutz LLP

(57) ABSTRACT

A device for drying sludge originating in a waste water treatment plant is enclosed in a greenhouse having a floor for receiving a bed of sludge to be dried. The greenhouse employs solar energy. A spreader located in the greenhouse ensures the the sludge is spread over the floor and turned as it progresses along the drying device. Fans are positioned over the spreader to provide for the renewal of air present in said greenhouse. A controller controls start up and shut down of a drying cycle as well as automatic control of all motorized components in response to measurement of the temperature of the surface of the bed of sludge. The controller also takes into account the difference in temperature between the surface of the bed of sludge to be dried and the atmosphere present in the drying plant, equipment in the greenhouse only being started up when this temperature difference reaches a predetermined set point.

2 Claims, 2 Drawing Sheets

U.S. PATENT DOCUMENTS 5,065,528 A    11/1991    Kaneko et al.

FOREIGN PATENT DOCUMENTS

| | | | |
|---|---|---|---|
| DE | 24 06 213 | A | 11/1975 |
| DE | 43 15 321 | A | 11/1994 |
| DE | 198 36 268 | A | 2/2000 |
| EP | 1 150 083 | A | 10/2001 |
| FR | 2 309 814 | A | 11/1976 |
| FR | 2 637 968 | A | 4/1990 |
| JP | 57 153189 | A | 9/1982 |
| JP | 04 165287 | A | 6/1992 |
| WO | WO 01/06190 | A | 1/2001 |
| WO | WO 01/06191 | A | 1/2001 |

OTHER PUBLICATIONS

Luboschik U., "Solre Schlammtrocknung Nach Dem Ist Verfahren.—Seit Drei Jahren Erprobung In Der Prasix.—Solar Sludge Druing Based on the Ist Process.—Process Three Years on Test in the Practice.—" At—Aufbereitungs Technik-Mineral Processing, at Verlag Fuer Aufbereitungs, Weisbaden, DE, vol. 39, No. 1, 1998, pp. 25-28.

DEVICE FOR DRYING PRODUCTS SUCH AS IN PARTICULAR PURIFYING STATION SLUDGE

FIELD OF THE INVENTION

The present invention relates to the drying of waste products, in particular of sludge originating from treatment plants for the purification of municipal or industrial wastewater, and it proposes to introduce a drying device employing solar energy.

BACKGROUND OF THE INVENTION

It is known that sewage sludge is inevitably produced as a waste product during the treatment of water: each individual produces on average approximately 20 kilos per annum thereof, which represents, for Europe, more than 10 million tons per annum, expressed on a dry basis, i.e. 50 million tons of raw sludge when reference is made to "wet" sludge, which is composed of 20% of dry mailer and 80% of water.

Currently, there are several possible end uses for this sludge, in particular: disposal on a landfill site, incineration and land application: in each of these cases, the drying of the sludge turns out to be an essential stage which makes it possible to reduce by a factor of 4 the volumes to be stored, transported and disposed of. However, due to numerous restrictions (in particular technical, health, regulatory, and the like), such routes for the discharge of sludge are increasingly, complex and thus increasingly expensive and they may even be challenged, indeed even banned, in places.

It is seen that this drying currently constitutes an expanding market and that it represents a significant part of the resulting cost of the processes for disposing of/enhancing in value the waste products represented by the biological sludge resulting from plants for the treatment of wastewater. This part increases as a proportion of the budget of the treatment plant as the capacity of the treatment plant decreases.

The majority of plants for the drying of sludge are "thermal drying" plants. They consume large amounts of energy (approximately 1000 kWh per of water evaporated), in particular fossil fuels, and they require the presence of qualified personnel and high capital costs. For this reason, these solutions according to the current state of the art are, economically speaking, poorly suited to small or medium capacity plants.

It has also been envisaged to dry the sludge by solar radiation, this technique exhibiting the advantage of using renewable energy and a simple construction technology coming under the notion of greenhouses of horticultural type. In order to improve the drying performance of such solar plants, the greenhouses are generally equipped with means which provide for the turning over of the sludge to be dried, indeed even its progression along the drying plant. Thus, the product to be dried always exhibits a wet surface in contact with the air, thus preventing the formation of a "crust" at the surface of the bed of sludge and making it possible to improve the efficiency of evaporation of the water during the drying treatment.

The solar dryer arrangements known currently provide for the extraction of the water vapor resulting from the gradual drying of the sludge by known phenomena of natural convection induced by the differences in density of the air in the greenhouse (these differences being due to the temperature and humidity gradients); solar dryers of this type are sometimes equipped with fans in order to provide for forced circulation and forced replacement of the gaseous atmosphere of the dryer (forced convection).

In the known plants, these fans are situated in the top part of the greenhouse (that is to say, "in the roofing") and they are proportioned so as to provide a certain level of renewal of the total volume of the air present in the greenhouse. For this reason, the cost of the "forced ventilation" element represents between 25 and 50% of the electricity consumption related to the operation of the dryer. In point of fact, optimization studies which have been carried out show that it is the renewal of the layer of air in immediate contact with the bed of sludge to be dried which has the greatest repercussions on the efficiency of the evaporation process.

The proportioning of a solar drying device is related to the weather aspects of the site where this device is installed. Furthermore, the operability of the drying equipment is extremely limited during the night and during winter: the annual availability, which is essentially diurnal, not exceeding 30% of the time. In addition, it is usual to regard, in temperate regions, 70% of the annual amount of water present in the sludge being evaporated during the hottest 3 months of the year.

These various requirements make it necessary to significantly exaggerate the size of the plants by providing large surface areas to dry relatively low amounts of sludge. Depending on the regions where the plant is installed, on the one hand, and on the degree of optimization of the processes employed, on the other hand, the surface area put into a solar dryer oscillates between 0.3 and 1 $m^2$ of greenhouse per tonne of sludge to be treated and per year (initial solids content of 25% and final solids content of 75%).

The operation of the solar drying equipment is advantageously under the control of the variations in one or more parameters, such as, in particular: the solar radiation measured, the temperature of the air or the humidity of the air inside and outside the greenhouse.

The system is thus activated according to the drying capability of the air, without taking into account the water vapor partial pressure at the surface of the sludge.

Another disadvantage of the solutions according to the prior art to this solar drying is that the feeding of the sludge, at one of the ends of the dryer, is carried out using a mobile charging appliance of the "tracked tractor" type equipped with a mobile bucket. The sludge is deposited in relatively even piles at the inlet of the greenhouse, without the surface of the sludge deposit being truly optimized and integrated with the drying zone.

BRIEF DESCRIPTION OF THE INVENTION

Starting from the state of the art mentioned above, the present invention proposes to introduce a solar drying plant which makes it possible in particular to reduce the drying time while expending less energy.

Consequently, the invention relates to a device for drying products, such as in particular sludge originating from plants for the treatment of municipal or industrial wastewater, employing solar energy produced in the form of a greenhouse comprising a slab or floor on which the bed of sludge to be dried is deposited, means being provided for ensuring that the sludge spread over said floor is turned over and that it is progressed along the drying device, the latter additionally comprising fans to provide for the renewal of the air present in said greenhouse, characterized in that said fans are positioned over the means which ensure that the bed of sludge is turned over and progressed.

According to another characteristic of the present invention, a system for sucking up and forcing back the air, positioned in the top part of the greenhouse, is additionally provided.

Other characteristics and advantages of the present invention will emerge from the description given below with reference to the appended drawings, which illustrate implementational examples thereof devoid of any limiting nature. In these drawings.

DETAILED DESCRIPTION OF THE INVENTION

Figure 1:
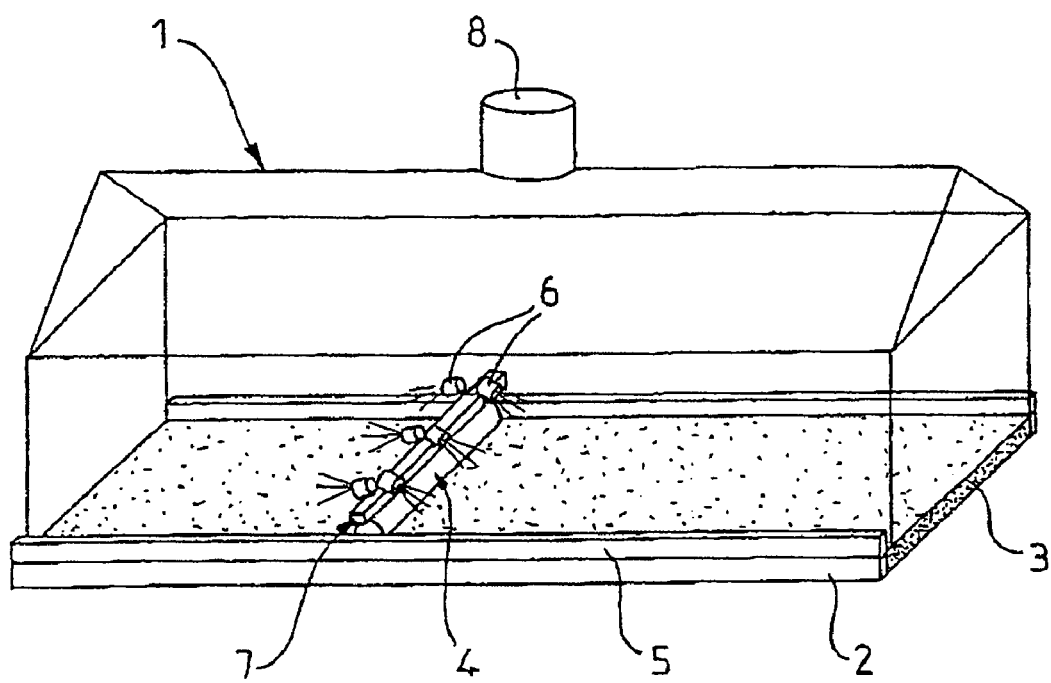
FIG. 1 is a diagrammatic view in perspective of a drying device according to the present invention.
Figure 2:
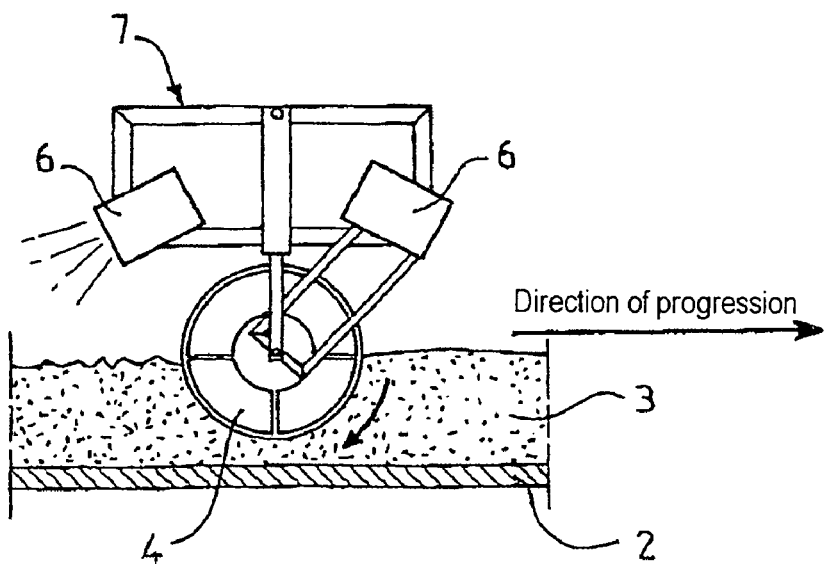
FIG. 2 is a sectional view, on an enlarged scale, through a vertical plane of the device of FIG. 1.

Reference is made first to FIG. 1, in which the following have been represented: by 1, the greenhouse of the drying device, which is installed on the slab 2 over which the bed of sludge 3 to be dried is spread. Low walls, such as 5, delimit at the sides the surface over which the bed of sludge is positioned. In this FIG. 1, the reference 4 denotes the device which ensures that the bed of sludge 3 on the floor 2 is turned over and progressed.

According to the invention, the fans 6 which ensure that the air present in the greenhouse 1 is renewed are positioned on the motor-driven frame 7 of the device 4, which is produced, for example, in the form of a scarification machine. By virtue of this arrangement, the renewal of the air in contact with the sludge to be dried is optimized: it is understood that only the air in contact with the bed of sludge 3 captures the moisture from the sludge. The proximity of the fans to the bed 3 makes it possible to reduce the "limiting layer" resulting from the flow of the air above the surface of the bed 3. The fact of providing the fans 6 on the frame of the scarification machine 4 makes it possible, whatever the direction of progression of the scarification machine, for the ventilation always to be carried out on the newly shifted product. According to the invention, an electrical limit-of-travel flipping system can be provided which makes it possible to select the fans which have to be actuated in order to optimize the results of the drying.

In addition to the advantage mentioned above, which consists in optimizing the renewal of the air in contact with the sludge, the invention makes it possible to accelerate the velocities of air in contact with the sludge, which makes it possible to reduce the drying time while expending less energy, the stream of air being focused on the drying zone instead of being dispersed throughout the volume of the greenhouse, as is the case in the drying systems according to the prior state of the art.

Thus, the greenhouse into which air is blown at the rate of 30 000 m$^3$/h, through an opening with an area of 35 m$^2$, gives a mean air velocity of 0.24 m/s (excluding natural convection). The same flow rate, produced according to the invention close to the bed of sludge (the fans 6 being positioned at a distance of the order of 1 to 1.50 m from the surface of the latter), makes it possible to increase by 2 to 4 times the velocity of the air in contact with the wet surface of the bed of sludge.

It is understood that, in the device according to the invention, the air sweeps across the sludge as soon as the latter is mixed, the sludge then being at a higher temperature than the ambient atmosphere ("black body" effect of the drying bed), which makes it possible to increase the vapor pressure differences between the turned-over sludge and the air. The renewal of the air in the drying chamber is carried out by natural convection, which becomes more efficient as the air becomes laden with moisture and therefore lighter.

According to the present invention, in order to ensure that the streams of air in the greenhouse are managed in a controlled way, a system for sucking up and forcing back the air, represented diagrammatically by 8 in FIG 1, which provides for continual renewal of the medium, can be provided.

Figure 3:
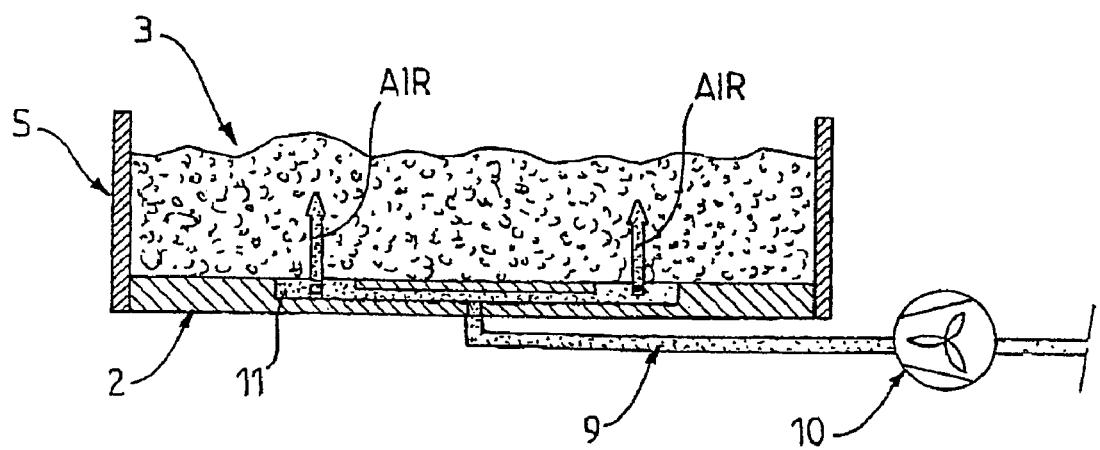
FIG. 3 illustrates another embodiment of the invention, in vertical section.

According to the invention, it is also possible to provide an additional system for ventilation via the ground. This system is represented in FIG. 3, in which the reference 9 denotes a pipe for introducing air under the effect of a fan 10, this pipe emerging through the bed of sludge 3 via a geotextile membrane 11. This system is installed in the second half of the route which the sludge follows in the drying device, that is to say at a point where the sludge is already sufficiently dehydrated to exhibit a granular and therefore noncaking structure. The fact, according to the invention, of injecting air through a geotextile membrane makes it possible to rapidly remove a significant fraction of the interstitial moisture of the sludge, this moisture being immediately entrained by the sweeping of air induced by the fans 6 mounted on the frame of the scarification machine 4. The prototypes produced according to the present invention have made it possible to confirm that the air flow rates involved are low, of the order of 0.05 to 5 m$^3$/m$^2$/s, in order to limit the air velocities to values below that of the velocity at which the dust is carried away.

According to the present invention, the operation (start up and shut down) and the automatic control of all the motorized components (scarification machine 4, fans 6, 10 and means for sucking up and forcing back the air 8) can be correlated with the measurement of the temperature of the surface of the bed of sludge 3 carried out using methods for long-range temperature recording, for example employing infrared detectors. It is also possible to take into account the difference in temperature between the surface of the drying bed and the atmosphere present in the drying greenhouse, the equipment only being started up, for example, if this temperature difference is at least 3° C., that is to say:

$$T = (T_{drying\ bed} - T_{atmosphere}) \geq +3°\ C.$$

According to the present invention, it is also possible to measure the relative humidity content of the atmosphere outside the drying greenhouse and to lay down a set point for bringing on line all the motorized components when this relative humidity is less than 80%, for example.

Finally, it is also possible to couple the measurements of the temperature difference T° C. specified above and of external relative humidity so that the first of these two values which reaches a predetermined set point triggers the start up of the equipment of the plant.

Figure 4:
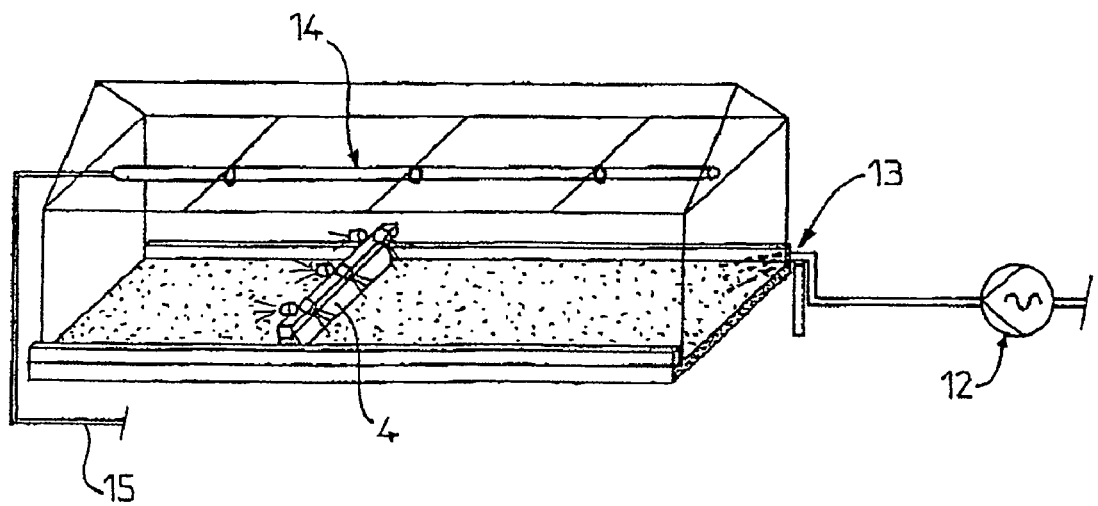
FIG. 4 is a view similar to FIG. 1 of another implementational example of the drying device according to the invention.

In an alternative form illustrated by FIG. 4, provision has been made for a system for feeding the sludge employing a metering pump 12 and a system for distributing and dispersing the sludge 13, so as to optimize the distribution of the sludge at the inlet of the drying device, the area served being used as drying space. The distributing system 13 makes it possible to deposit the sludge as a uniform layer over the entire width of the greenhouse on the side of the area served, in a way controlled and automated according to requirements.

According to the present invention, it is also possible to employ radiant panels, radiant pipes or any other system for heating large buildings, in order to ensure that the surface of the bed of sludge is heated.

In the implementational example illustrated by FIG. 4, a radiant pipe has been represented by 14. The energy used to heat the pipe can be a combustible gas (introduced via a pipe such as 15) or biogas or alternatively a means for producing electricity from renewable or nonrenewable energy.

The use of this radiant heating technique exhibits the advantage of heating the sludge by the effect of infrared radiation, the heat being transmitted essentially to the surface of the bed of sludge 3 without substantially heating the surrounding air. The volumes of air which are displaced by natural or forced convection will have a relatively slight affect on the rise in temperature of the surface of the bed of sludge. The infrared radiation thus produced will make it possible to simulate the 24 h/24 solar effect, whatever the period of the year, the weather conditions, and the like. The surface area put into such drying devices can, in this case, be reduced by a factor of 1.5 to 3.

It remains, of course, that the present invention is not limited to the various implementational examples described and/or represented here but that it encompasses all the alternative forms thereof.

What is claimed is:

1. A device for drying sludge originating in a waste water treatment plant, and comprising:
   a greenhouse having a floor for receiving a bed of sludge to be dried, the greenhouse employing solar energy;
   means located in the greenhouse for ensuring that the sludge is spread over said floor and turned as it progresses along the drying device;
   fans positioned over the spreading means to provide for the renewal of air present in said greenhouse; and
   means for controlling start up and shut down of a drying cycle and automatic control of all motorized components in response to measurement of the temperature of the surface of the bed of sludge;
   wherein the controlling means also take into account the difference in temperature between the surface of the bed of sludge to be dried and the atmosphere present in the drying plant, equipment in the greenhouse only being started up when this temperature difference reaches a predetermined set point.

2. A device for drying sludge originating in a waste water treatment plant, and comprising:
   a greenhouse having a floor for receiving a bed of sludge to be dried, the greenhouse employing solar energy;
   means located in the greenhouse for ensuring that the sludge is spread over said floor and turned as it progresses along the drying device; and
   fans positioned over the spreading means to provide for the renewal of air present in said greenhouse;
   means for controlling start up and shut down of a drying cycle and of automatic control of all motorized components in response to measurement of the temperature of the surface of the bed of sludge;
   wherein measurements of temperature difference and of relative humidity of the external atmosphere are coupled so that the first of these two values which reaches a predetermined set point triggers start up of the equipment.

* * * * *